Figure 1:
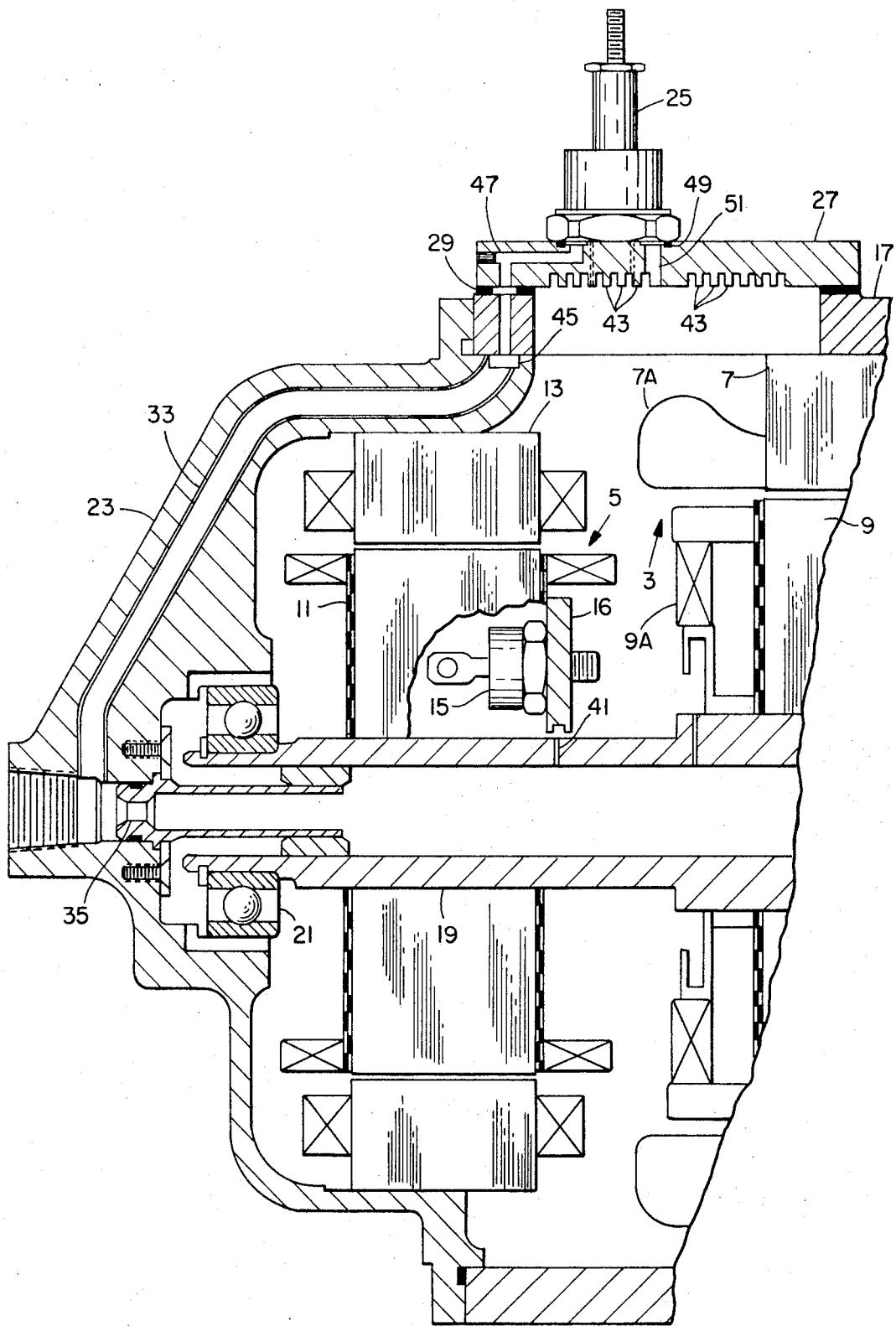

United States Patent [19]
Potter

[11] 3,733,503
[45] May 15, 1973

[54] OIL SPRAY COOLED, BRUSHLESS, VARIABLE SPEED DIRECT CURRENT GENERATOR

[75] Inventor: Frederick Milton Potter, Little Silver, N.J.

[73] Assignee: The Bendix Corporation, Teterboro, N.J.

[22] Filed: June 16, 1972

[21] Appl. No.: 263,504

[52] U.S. Cl..................310/68, 310/54, 321/8 C
[51] Int. Cl..................................H02k 11/00
[58] Field of Search..............310/54, 61, 68; 321/8, 8 C

[56] References Cited
UNITED STATES PATENTS

| | | | |
|---|---|---|---|
| 2,942,165 | 6/1960 | Jackson et al. | 321/8 C |
| 3,145,314 | 8/1964 | Becker | 310/54 X |
| 3,275,921 | 9/1966 | Fellendorf et al. | 321/8 C |
| 3,369,166 | 2/1968 | Lake | 321/8 C |
| 3,562,564 | 2/1971 | Potter | 310/54 |

FOREIGN PATENTS OR APPLICATIONS 1,017,026  1/1966  Great Britain..................310/68

Primary Examiner—William M. Shoop, Jr.
Attorney—S. H. Hartz and A. F. Cuoco

[57] ABSTRACT

An oil cooled generator has a plurality of diodes for converting alternating current power to direct current power. The diodes are mounted on heat sinks exteriorly of the generator so the diodes can be assembled to and disassembled from the generator without dismantling the generator. The heat sinks are cooled by spraying oil on finned surfaces of the heat sinks inside the generator and by circulating cooling oil at turbulent velocity between the diodes and heat sinks over major portions of the diode mounting surfaces for directly cooling the diodes and heat sinks.

11 Claims, 5 Drawing Figures

OIL SPRAY COOLED, BRUSHLESS, VARIABLE SPEED DIRECT CURRENT GENERATOR

The invention relates to dynamo-electric machines and more particularly to oil cooled direct current generators using rectifiers for converting alternating current power from the generator to direct current power.

In U. S. Pat. No. 3,562,564, assigned to the same assignee as the present application, rectifiers for converting alternating current power to direct current power were mounted on a heat sink and the assembly of heat sink and rectifiers was mounted inside the generator. With this arrangement, if a rectifier failed the entire generator had to be disassembled to replace the rectifier.

Also, the heat sinks were oil cooled by permitting oil to flow through passages in the heat sinks. There was no direct oil cooling of the rectifiers. The rectifiers were cooled only by transfer of heat to the heat sinks.

The present invention contemplates a generator in which the rectifiers, such as silicon diodes, are mounted on heat sinks exteriorly of the generator and the heat sinks are cooled by oil flowing between the heat sinks and rectifiers at turbulent velocities over a major portion of the rectifier mounting surface, and by oil sprayed on finned surfaces on the heat sinks inside the generator. With this arrangement the rectifiers can easily be replaced without dismantling the generator. This arrangement permits operation of the generator at full rated load with maximum inlet oil temperature of 240°F whereas heretofore only 60 percent full rated load with maximum inlet oil temperature of 180°F was possible.

One subject of the present invention is to provide an oil cooled generator with diodes which are assembled to the generator from the exterior of the generator and which may be replaced without disassembling the generator.

Another object of the invention is to cool the diodes by flowing cooling oil at turbulent velocity directly over a major portion of their mounting surfaces.

Another object is to mount the diodes on heat sinks and flow cooling oil between the heat sinks and diodes.

Another object is to spray oil on finned surfaces of the heat sinks inside the generator.

These and other objects and advantages of the invention will appear more fully hereinafter from a consideration of the detailed description which follows, taken together with the accompanying drawings wherein one embodiment of the invention is illustrated by way of example. It is to be understood, however, that the drawings are for the purpose of illustration only and are not a definition of the limits of the invention, reference being had to the appended claims.

Figure 2:
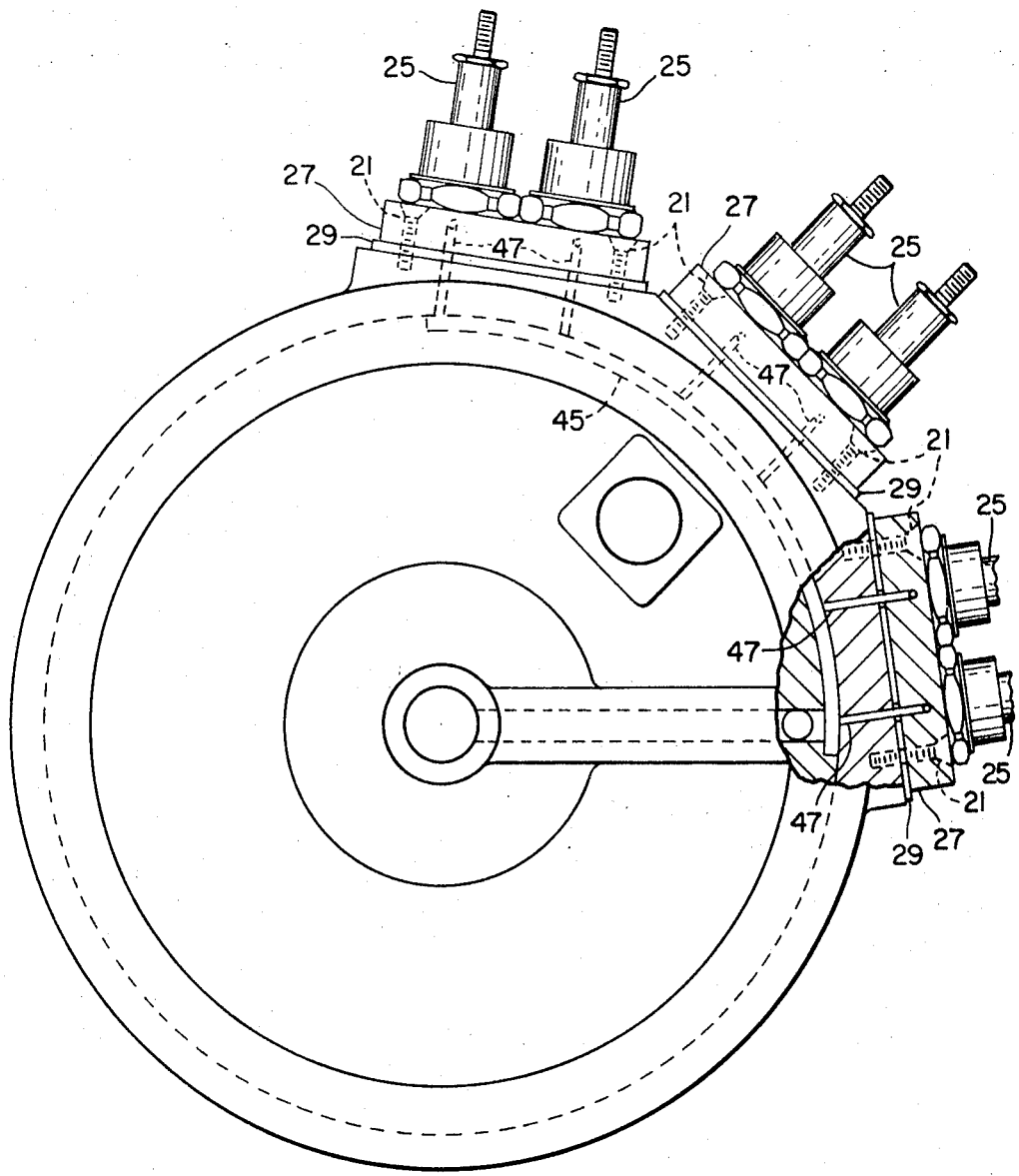
Figure 3:
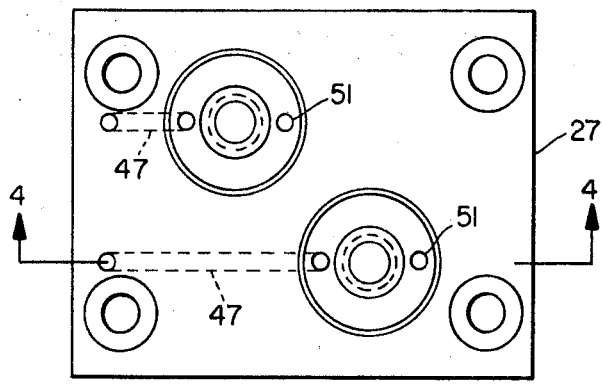
Figure 4:
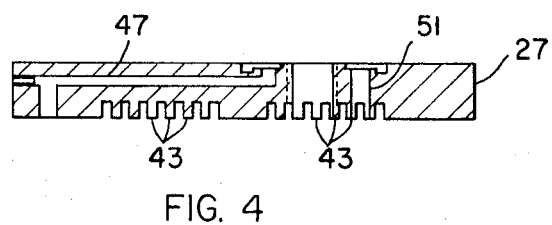
Figure 5:
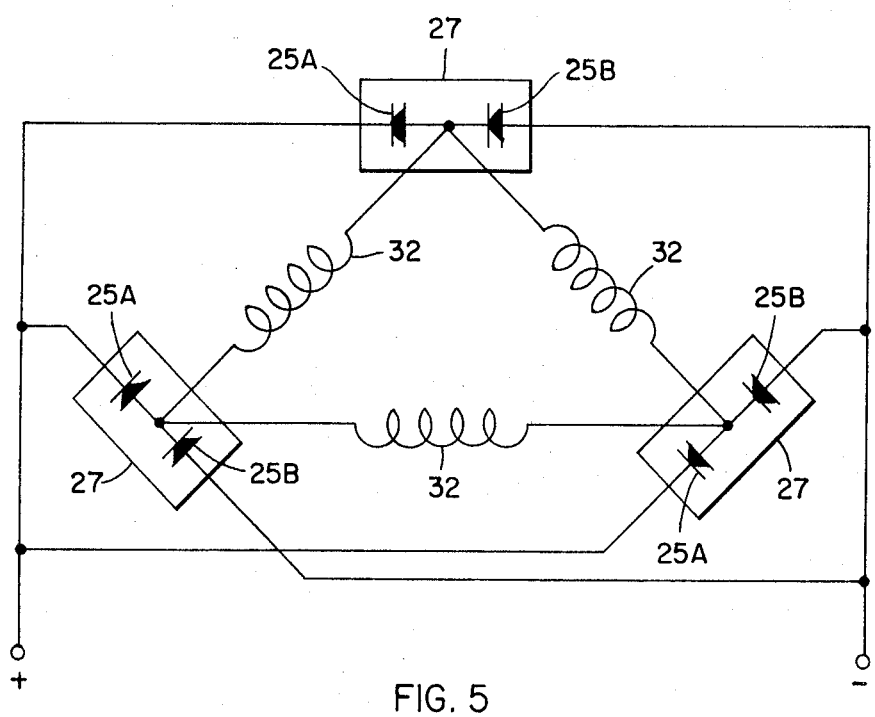

In the drawings,

FIG. 1 is a partial vertical section of a generator constructed according to the invention, FIG. 2 is a transverse section taken approximately on the line 2—2 of FIG. 1, FIG. 3 is a top view of a heat sink, FIG. 4 is a sectional view of a heat sink taken approximately on the line 4—4 of FIG. 3, and FIG. 5 is a schematic diagram showing the electrical arrangement of the diodes and heat sinks.

Referring to the drawings, FIGS. 1 and 2 show a novel dynamo-electric machine constructed according to the invention. The dynamo-electric machine is illustrated as a brushless direct current generator having a main generator 3 and an exciter 5. Main generator 3 has a stator 7 and a rotating field 9. Exciter 5 has a rotating armature 11 and a stationery field 13. Exciter 5 generates three phase variable frequency alternating current voltage which is full wave rectified by diodes 15 mounted on heat sink 16 on the rotor. The rectified output of the exciter rotating armature 11 is connected to the main generator rotating field 9 and supplies the necessary excitation power. The main generator stator 7 and the exciter stationery field 13 are secured to a housing 17 and the main generator rotating field 9 and exciter rotating armature 11 and associated diodes 15 and heat sinks 16 are mounted on a hollow rotor shaft 19. The shaft is mounted for rotation in the housing 17 by ball bearings 21 in an endbell 23 of the housing.

The main stator provides a variable frequency alternating current output which is converted to direct current power by diodes 25 mounted on heat sinks 27 preferably in the form of thick copper plates. The diodes and heat sinks are mounted exteriorly of generator housing 17. Heat sinks 27 are insulated from housing 17 by a gasket 29 of suitable insulating material, such as Neoprene, and the heat sinks are secured to the housing by insulated screws 21, such as high temperature nylon clad steel screws. Heat sinks 27 have fins 43 formed on surfaces facing inwardly of the housing to increase surface area for cooling purposes.

As shown in FIG. 5, main stator three phase winding 32 is connected in delta and each corner of the delta is connected to a heat sink 27 so that the heat sinks are at the potentials of the stator terminals. One forward polarity diode 25A and one reverse polarity diode 25B is mounted on each heat sink in electrical conducting relationship thereto and the three forward polarity diodes are connected together to a positive output terminal and the three reverse polarity diodes are connected together to a negative output terminal.

Cooling oil is introduced into the generator at the anti-drive end and is supplied from a separate source such as the oil system of a diesel engine or gear box, and may vary in pressure from approximately 10 psi to 50 psi. Approximately 15 percent of the cooling oil is conducted through a passage 33 cast into endbell 23 of housing 17 and the remainder of the oil flows through a restricted orifice 35 into the hollow rotor shaft where it is discharged through metering orifices 41 appropriately located to spray cool rotating diodes 15 and their heat sinks 16, the exciter armature 11 and the main generator rotating field coils 9a, substantially as disclosed in U. S. Pat. No. 3,596,120, issued July 27, 1971 and assigned to the same assignee as the present application. The oil is then propelled by centrifugal force against the stator end turns 7a and onto the finned inner surfaces of heat sinks 27.

The oil flowing through passage 33 in housing endbell 23 flows through a pilot bore 45 in housing 17 into passages 47 in the heat sinks. Small depressions, which may be 0.010 to 0.012 inch deep are cut into the heat sink surfaces adjacent the diode mounting surfaces and grooves to accommodate O rings 49 are machined at the outer edge of the depressions. When the diodes are assembled to the heat sinks the O ring seals between the diodes and heat sinks prevent leakage of oil and the depressions provide channels for passing cooling oil at turbulent velocity over major portions of the diode mounting surfaces to extract heat directly from the diode bases as well as from the heat sinks. The oil then discharges through a small passage 51 in the heat sink directly opposite the inlet hole into the generator and then flows by gravity toward the drive end where it exits through suitable passages and returns to the engine or gear box sump. This arrangement permits operation at full rated load with maximum inlet oil temperature of 240°F, whereas heretofore only 60 percent capacity with maximum inlet oil temperature of 180°F was possible.

The arrangement described permits the diodes to be mounted externally of the generator for ready servicing while the heat sinks and bases of the diodes are cooled efficiently by oil from the interior of the generator.

What is claimed is:

1. A dynamo-electric machine comprising an oil-cooled generator providing alternating current power,
   heat sinks mounted on the generator,
   rectifying means mounted on the heat sinks in heat conducting relationship thereto for converting the alternating current power to direct current power, and
   means for conducting cooling oil between the heat sinks and rectifying means for directly cooling the heat sinks and rectifying means.

2. A dynamo-electric machine as described in claim 1 in which the rectifying means are mounted exteriorly of the generator so that the rectifying means can be assembled to and disassembled from the generator exteriorly thereof.

3. A dynamo-electric machine as described in claim 2 including means for spraying cooling oil on the heat sinks interiorly of the generator.

4. A dynamo-electric machine as described in claim 2 in which fins are formed on faces of the heat sinks sprayed by oil to facilitate cooling.

5. A dynamo-electric machine as described in claim 2 in which the rectifying means comprises a plurality of diodes.

6. A dynamo-electric machine as described in claim 1 which includes means for electrically insulating the heat sinks from the generator.

7. A dynamo-electric machine as described in claim 6 in which heat sink is connected to a generator output terminal and a pair of oppositely poled diodes are mounted on each heat sink in electrical conducting relationship thereto.

8. A dynamo-electric machine as described in claim 1 including means for circulating cooling oil at turbulent velocity over major portions of the mounting surfaces of the rectifying means.

9. A dynamo-electric machine comprising an oil cooled generator for providing alternating current power,
   heat sinks mounted on the generator,
   rectifying means for converting the alternating current power to direct current power mounted on the heat sinks in heat conducting relationship thereto so that heat from the rectifying means is transferred to the heat sinks, and
   means for spraying cooling oil on the heat sinks for cooling the heat sinks and rectifying means.

10. A dynamo-electric machine as described in claim 9 in which the rectifying means are mounted exteriorly of the generator so that the rectifying means can be assembled to and disassembled from the generator exteriorly thereof, and the heat sinks are mounted so that cooling oil is sprayed on the heat sinks from the interior of the generator.

11. A dynamo-electric machine as described in claim 10 in which fins are formed on faces of the heat sinks sprayed by oil to facilitate cooling.

* * * * *